Figure 1:
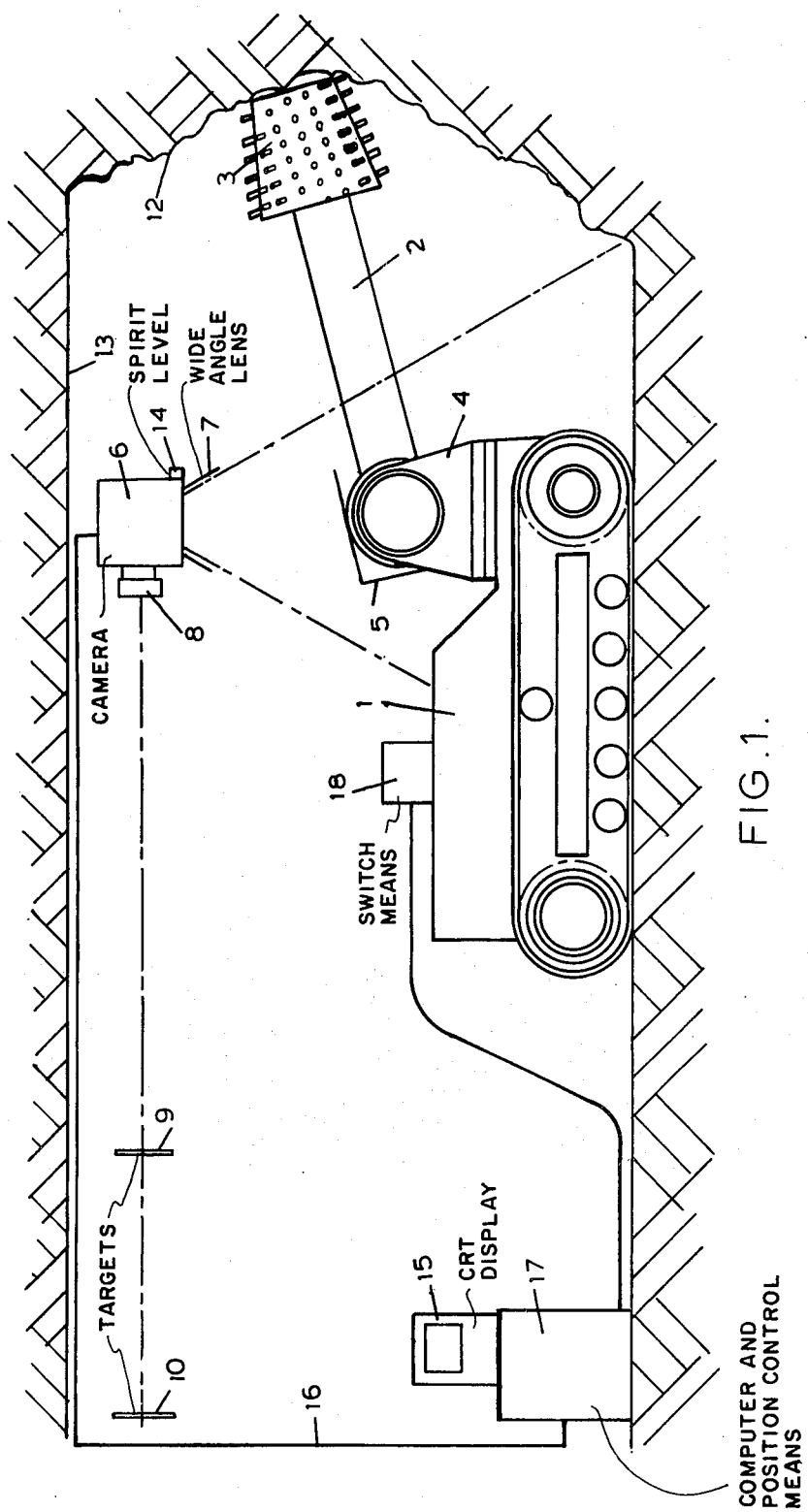

United States Patent [19]

Hay et al.

[11] 4,238,828

[45] Dec. 9, 1980

[54] POSITION DETECTING APPARATUS

[75] Inventors: Andrew G. Hay, Hamilton, Scotland; Peter R. Mason, York, England

[73] Assignee: The Secretary of State for Industry in Her Britannic Majesty's Government of the United Kingdom of Great Britain and Northern Ireland, London, England

[21] Appl. No.: 949,185

[22] Filed: Oct. 6, 1978

[30] Foreign Application Priority Data

Oct. 7, 1977 [GB] United Kingdom ............... 41808/77

[51] Int. Cl.³ .......................... G01V 5/00; E21B 25/16
[52] U.S. Cl. ...................................... 364/559; 175/45; 250/254; 364/422; 364/516
[58] Field of Search ............... 364/436, 449, 518, 525, 364/516, 420, 422, 559; 250/341, 342, 253, 254; 299/1; 37/DIG. 1; 358/113; 175/40, 41, 45

[56] References Cited

U.S. PATENT DOCUMENTS

| | | | |
|---|---|---|---|
| 2,972,742 | 2/1961 | Ross | 364/436 |
| 3,260,478 | 7/1966 | Welti | 364/516 |
| 3,671,723 | 6/1972 | Delignieres et al. | 364/449 |
| 3,922,533 | 11/1975 | Royal | 364/516 |
| 4,060,730 | 11/1977 | Zioni et al. | 364/525 |
| 4,107,530 | 8/1978 | Brumfield et al. | 250/342 |

*Primary Examiner*—Errol A. Krass
*Attorney, Agent, or Firm*—Pollock, Vande Sande and Priddy

[57] ABSTRACT

Position detecting apparatus having a target comprising radiation emitting means for emitting radiation to define four points in non-planar relationship such that a first set of three of the points lies in a first target plane while a second set of three of the points lies in a second target plane which may for example be substantially normal to the first target plane; a camera having a focal plane on which images of objects presented to the camera are formed, the camera being arranged for viewing said target, and being provided at said focal plane with a two-dimensional array of photo sensitive elements which can receive radiation from the radiation emitting means of the said target; and a computer arranged to scan said two dimensional array to generate signals indicative of the position of images of the radiation emitting means on the array, whereby the position of the target, and hence of an object to which it is attached, may be determined in relation to a selected reference plane.

16 Claims, 8 Drawing Figures

POSITION DETECTING APPARATUS

This invention relates to position detecting apparatus adapted to calculate the position of an object in space from the detection in position of the projection of a predetermined set of points onto a plane of given position.

Apparatus in accordance with this invention is particularly suitable for detecting the position of the operating head of a slow moving machine working in an environment which is hostile to close manual control by an operator and in which the operating head is obscured. By way of example such a machine is a tunnelling machine.

According to this invention there is provided apparatus for detecting the position of an object comprising:

a. a target for attachment to the object or to a member having a definable positional relationship to an object the position of which is to be detected, said target having identifying means for defining therein at least four target points in non-coplanar relationship;

b. a camera, having a focal plane at which images are formed, arranged for viewing the target and for forming on the focal plane images of at least four said target points;

c. a computer arranged to receive signals indicative of the position of the four points on the focal plane of the camera and for calculating from said received signals the orientation of the said target points relative to a reference plane, and for calculating thereby the position of the said object as projected on to any selected reference plane.

It is most convenient to arrange a first set of three out of four target points so each lies at a vertex of a first right angled triangle and a second set of three out of four target points so each lies at a vertex of a second right angled triangle, such that the bases of the triangles and the junction of the hypotenuses of the triangles with the bases are common. The first and second triangles may conveniently be normal to each other.

The points in the target planes may be defined by radiation means comprising radiation emitting devices at those points or by radiation means comprising radiation emitting devices defining straight lines which intersect at the points. The devices may be light emitting diodes (LEDs). It is preferable that the LEDs are of a type that emit radiation over a large solid angle. LEDs which emit radiation in the infra red part of the spectrum may be employed with the advantage that the camera may be provided with a filter which passes the LEDs radiation but blocks visible light thereby lessening the risk of the camera and computer being confused by spurious light sources. This risk may also be lessened by including switch means for controlling the computer and the emission of radiation from the radiation means so that comparison can be made between the radiation received by the camera when the radiation emitting means is and is not emitting radiation.

The switch means may be arranged to control the computer and radiation means so that the camera receives, sequentially, radiation defining points in the first and second sets of three points.

The camera may have at its focal plane a 2-dimensional array of elements sensitive to the radiation emitted by the radiation means and in this case the computer may perform a linear regression operation upon the points on the focal plane corresponding to the elements in the array activated by the radiation means. Linear regression operations are in themselves well known, and are described for example in "*A Short Introduction To Numerical Analysis*" by M. V. Wilkes, Cambridge, University Press 1977.

When each of the four non-coplanar points is identified by effectively a point-source radiation emitting means, e.g. an LED, the computer is desirably arranged to perform a center-of-gravity fit (e.g., as described in Machinery's Handbook, 16th Edition, p. 307) on the illuminated elements on the focal plane of the camera corresponding to the elements of the two-dimensional array illuminated by the said radiation emitting means.

The computer may include a store containing the co-ordinates of a portion of the object relative to the position of the target when attached to the object and the computer may extract said co-ordinates to calculate the position of said portion as projected on to said reference plane. There may also be provided display means including a cathode ray tube for displaying an image of said portion as projected in the reference plane, or another selected plane, e.g. one normal to the tunnel direction.

Apparatus in accordance with this invention may include a control means responsive to the computer for controlling the position of the object in order to maintain it within a predetermined range of positions as projected in said reference plane, or other selected plane. Appropriate control means are described, for example, in "*Control Systems Engineering*" by Del Toro and Parker, McGraw-Hill 1960.

Figure 2:
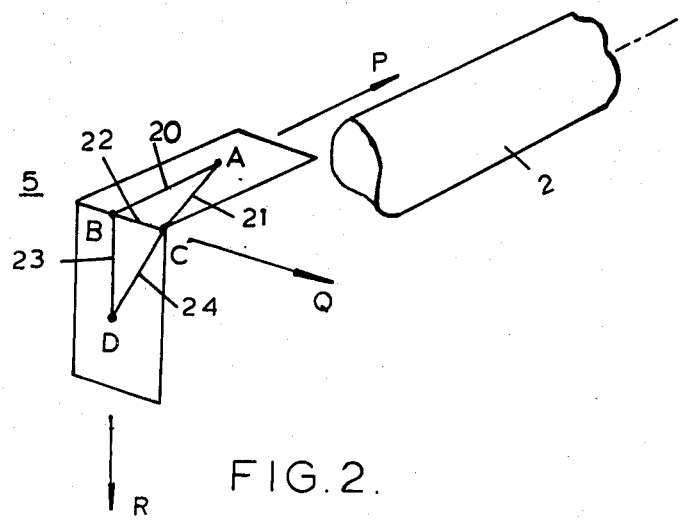
Figure 3:
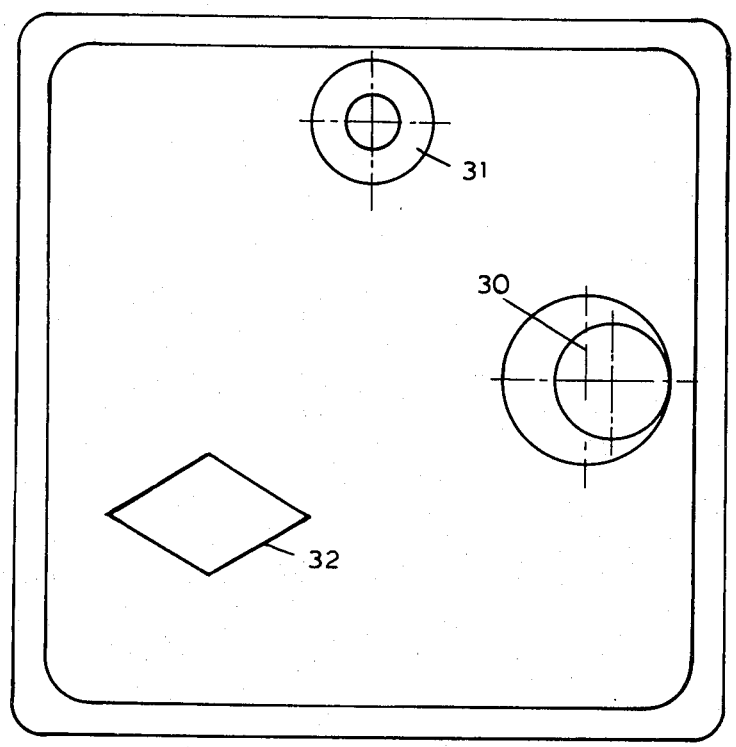
Figure 4:
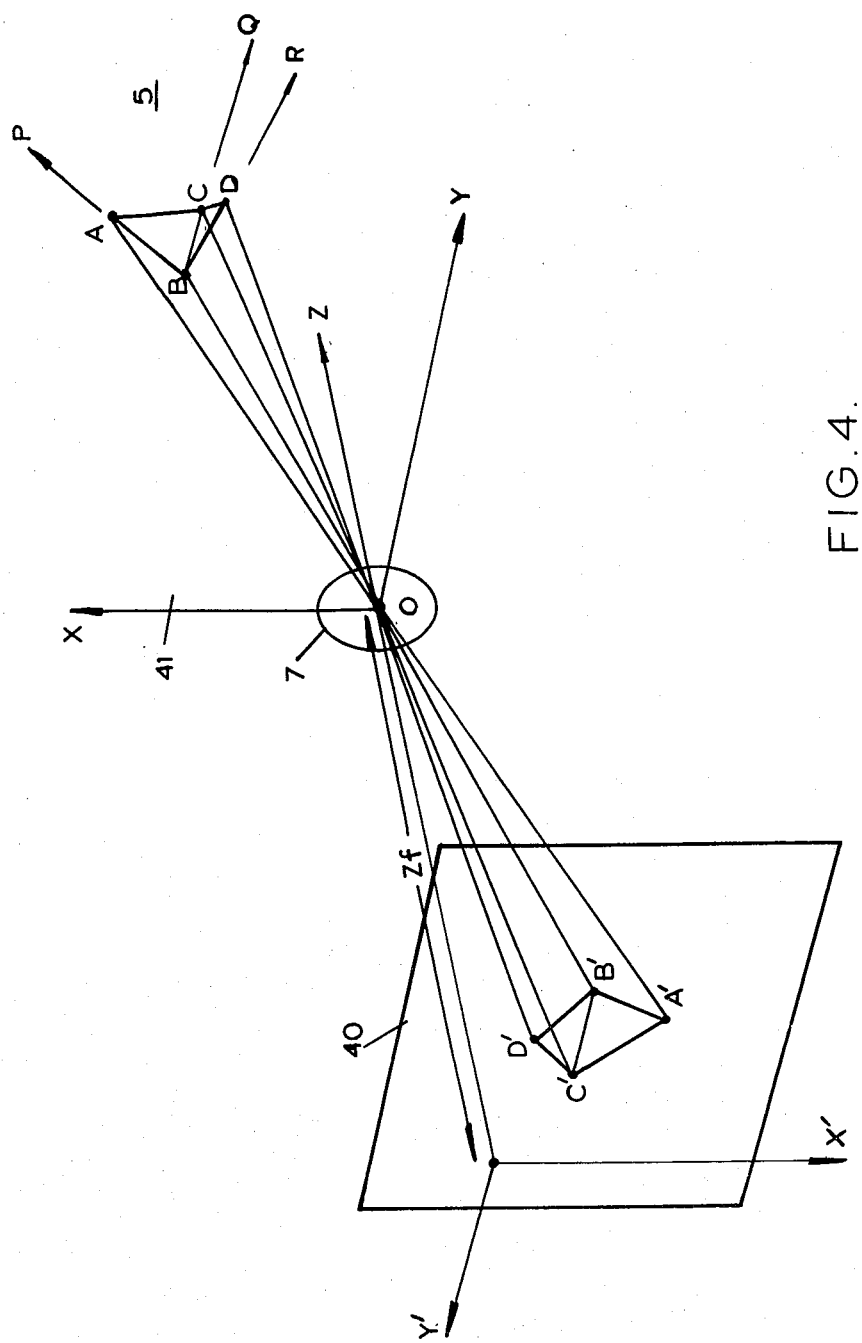
Figure 5:
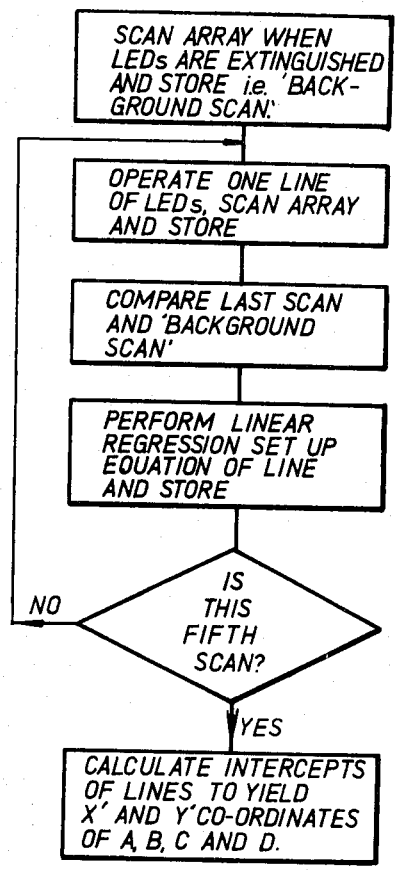
Figure 6:
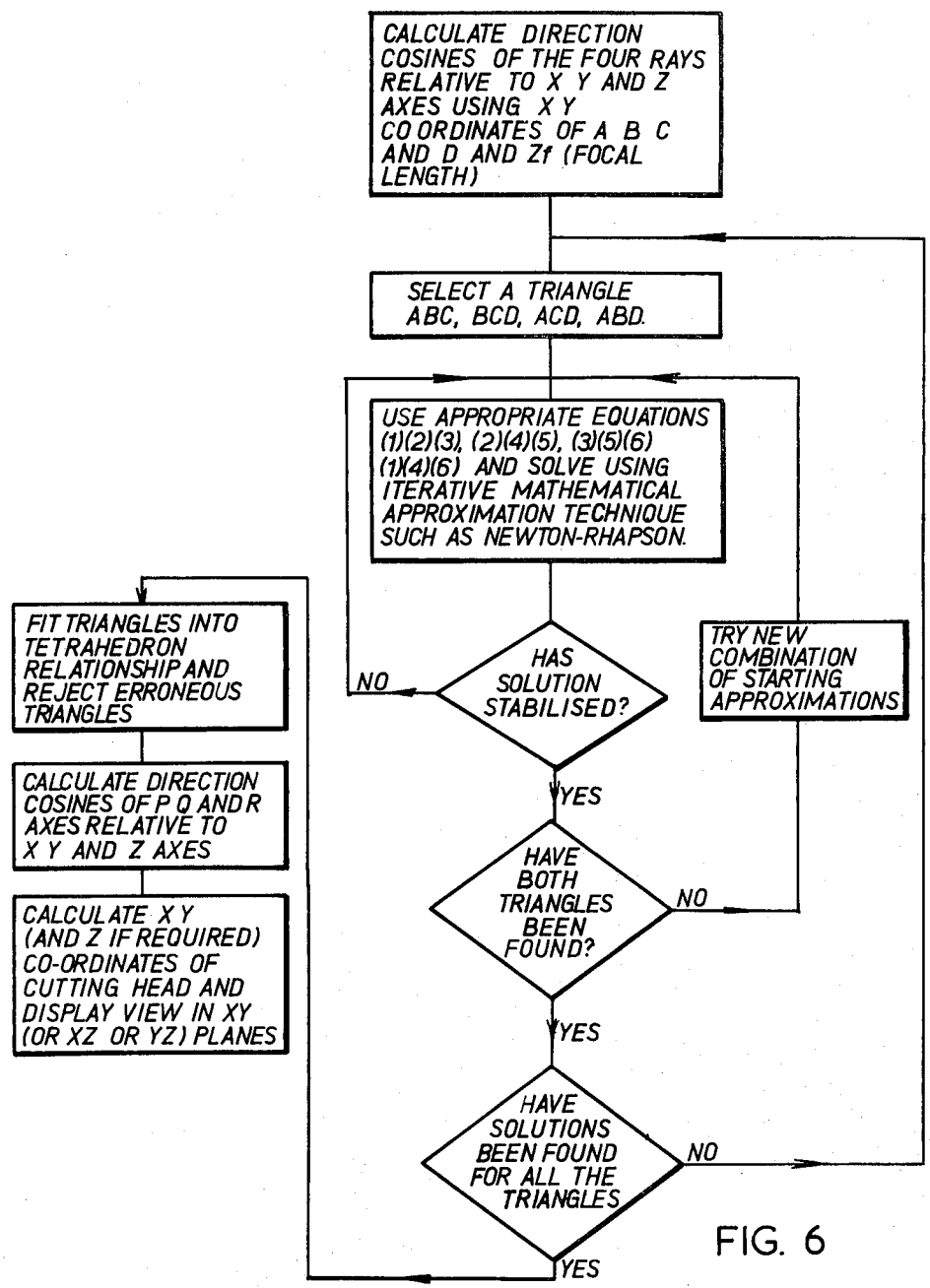
Figure 7:
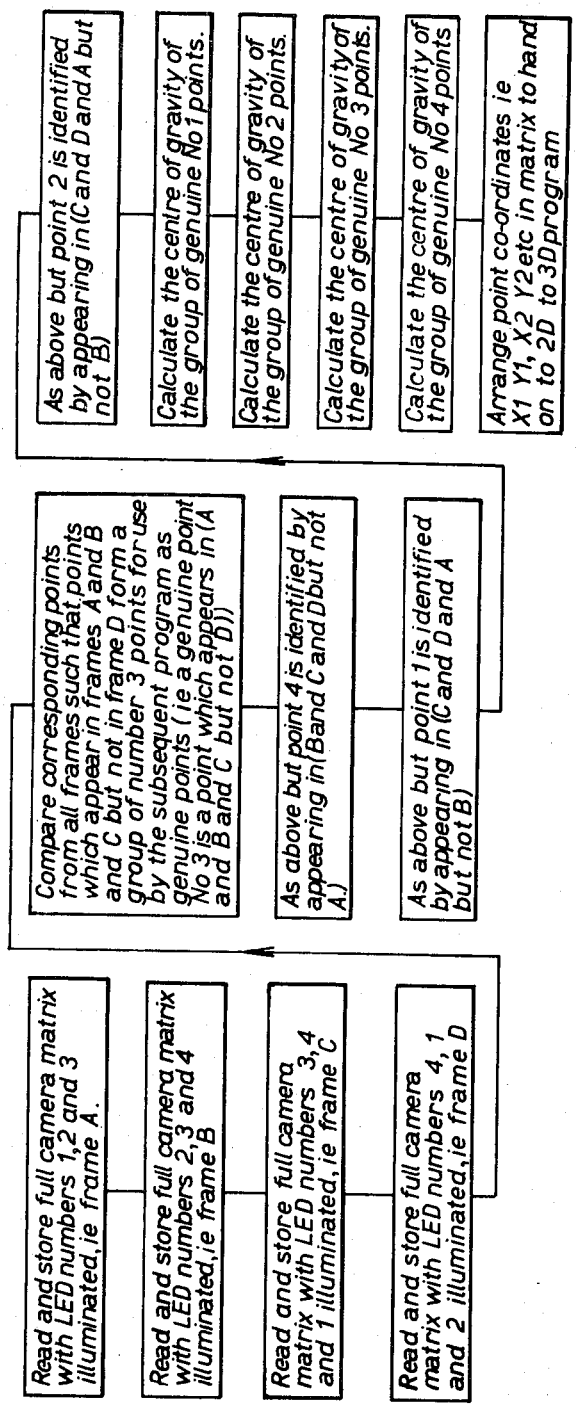
Figure 8:
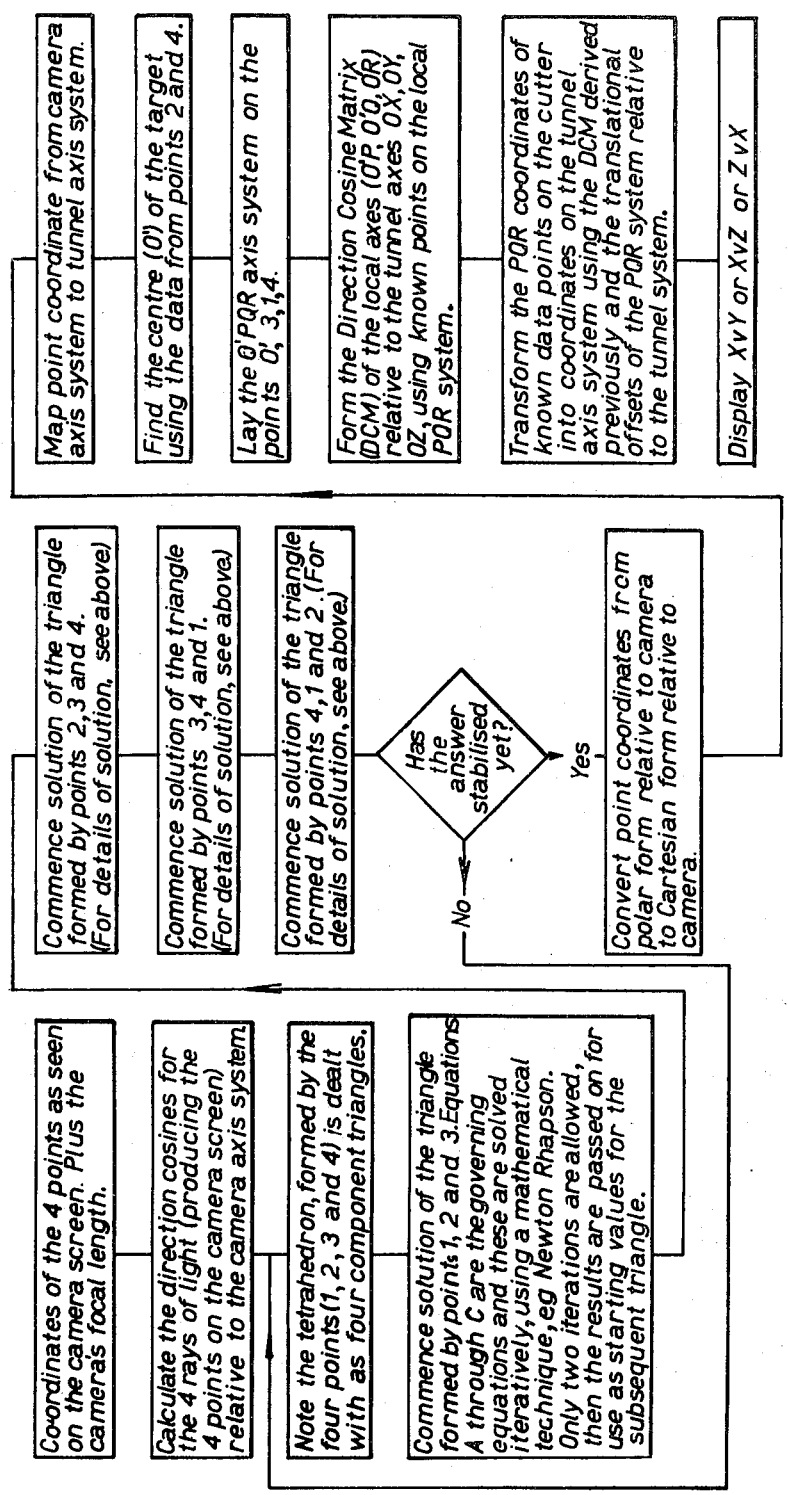

The invention will now be described by way of example only with reference to the accompanying drawings of which:

FIG. 1 is a schematic diagram of a tunnelling machine incorporating position detecting apparatus in accordance with this invention, FIG. 2 shows the arrangement of the LEDs of the target of the apparatus shown in FIG. 1, FIG. 3 shows a typical display of the views seen by the camera and the output provided by the computer, FIG. 4 shows the relationships between the reference plane and the target planes, FIG. 5 is a flow chart showing the steps involved in generating signals indicative of points in the target plane as seen in the reference plane, FIG. 6 is a flow chart showing the steps involved in calculating the relative orientation of the reference and first target plane and in calculating the position of the cutting head of the tunnelling machine as projected on to the reference plane, FIG. 7 is a flow chart illustrating a program to determine the location of four points on the focal plane of the camera by utilizing the "A and B and C but not D" principle in biasing the frame data and calculating the center of gravity of groups of "genuine points", and FIG. 8 is a flow chart illustrating a program to calculate the three dimensional position of a known three dimensional target from two-dimensional co-ordinate positions in the camera; and to refer co-ordinates of points known relative to the target to new reference axes of the camera and of a tunnel in which the camera is located.

FIG. 1 shows schematically a tunnelling machine which includes a tracked power unit and prime mover 1 and a boom 2 carrying a cutting head 3. The boom 2 is attached to the power unit 1 by means of a joint 4 which permits the boom to be orientated in any direction relative to the power unit 1. The boom 2 has a target 5 attached to it. The target is shown in greater detail in FIG. 2. The target (FIG. 2) includes five lines of LEDs 20 to 24 which at their intersections define the vertices A, B, C and D of two right angled triangles ABC and BCD which are disposed at right angles to one another. The bases of the triangles and the junction of their hypotenuses AC and CD with their bases are common. The sides BA, BC and BD form the co-ordinate axes P, Q and R respectively of a cartesian co-ordinate system which is fixed relative to the boom 2 and cutting head 3' (FIG. 1). Referring again to FIG. 1 there is provided a camera 6 which is equipped with a wide angle lens 7 to view the target 5 and a telephoto lens 8 to view two further targets 9 and 10. The angle of view of the wide angle lens 7 is indicated by the chain lines 11. It will be seen that when the tunnelling machine has cut sufficient material from the tunnel face 12 to be close to the edge of the field view the camera 6 will have to be moved to the right in the figure. To ensure that the camera is accurately positioned and repositioned with respect to a predetermined datum line targets 9 and 10 are provided and these are fixed to the tunnel roof 13 to establish said datum line. Target 9 is a cross target and target 10 is a ring target. A spirit level 14 is provided to position the camera with respect to gravity. When the camera is correctly positioned the targets 9 and 10 will appear as shown as image 31 in FIG. 3. FIG. 3 shows the scenes 31 and 32 viewed by the camera by its two lenses 8 and 7 respectively and an image 30 of the cutting head 3 as it would appear to the camera if it could be viewed directly. The display appears on a cathode ray tube 15 located remote from the tunnelling machine and connected to the camera via a computer 17 and an electrical cable 16. The computer 17 processes the signals generated by the camera to control the cathode ray tube to display the image 30 and the scenes 31 and 32. Also connected to the computer 17 is switch means 18 for controlling the operation of the lines of LEDs 20 to 24 (FIG. 2) in the target 5.

Display of the further targets, or back-sights 9 and 10 as image 31 is not an essential feature. An operator may use a telescope (not shown) mounted on the camera 6 to prealign the camera directly in relation to the back-sights 9 and 10.

With reference to the flow charts shown in FIGS. 5 and 6, and FIG. 4 which shows the relationship between the reference and target planes, the generation of the image 30 will now be described. In FIG. 4 there is shown the target 5, the wide angle lens 7 of the camera and the focal plane 40 of the camera. The three points A, B and C in the first target plane which is coplanar with the plane bounded by the axes P and Q of a cartesian co-ordinate system P, Q and R form by means of lens 7 corresponding image points A'B'C' in the focal plane 40 which is parallel with the reference plane 41 containing the axis X and Y of a cartesian co-ordinate system X Y and Z. The Z ordinate is coincident with the optical axis of the lens 7. The focal plane includes two mutually orthogonal axes X' and Y' which are parallel to the axis X and Y and have their origin at the intersection with the optical axis of the lens 7. Positioned at the focal plane 40 of the camera is a target sensitive to the radiation emitted by the LEDs of the target.

For use with a tunnelling machine shown in FIG. 1 the camera is preferably a solid-state device which is consequently robust and reliable in the tunnelling environment. In this case the camera focal plane will coincide with a two dimensional array of radiation sensitive elements. Consequently the images of the lines of LEDs formed by the lens and projected onto the array will activate elements on and, at some positions along the image, on either side of the image due to the image and the elements having a finite size. Therefore in order to improve the resolution of such a camera the computer is programmed to perform a linear regression operation upon the points on the focal plane corresponding to the activated elements.

Referring now to FIG. 5 which shows the steps involved in generating signals indicative of the position of points of the target planes as formed on the focal plane; the first step is for the computer to scan the cameras array when the LEDs are extinguished and to generate signals indicative of the scene projected onto the array. These signals are stored by the computer and used by the computer to compare with the generated signals when at least some of the LEDs are operated to ensure that spurious signals present in the scene viewed by the camera do not affect the operation of the apparatus. To avoid ambiguities in the signals generated by the computer the lines of the LEDs (20 to 24 in FIG. 2) are operated in sequence by the switch means 18 shown in FIG. 1 under control of the computer 17. Therefore the steps shown in FIG. 5 are to scan and store the generated signals, hereinafter referred to as the background scan, when all the lines of the LEDs are extinguished as aforesaid and then to operate a line of LEDs, say line 20 in FIG. 2, to scan the array, store the generated signals and to compare them with the background scan. Then the computer performs a linear regression operation to fit the best straight line to the points on the focal plane corresponding to the elements activated in the array by the image of the line 20 of LEDs projected on to it. The computer then sets up the equation of the best straight line in the focal plane and stores it. These steps are repeated for the other four lines in the target. The computer then using the stored equations calculates the intercepts of the best straight lines in the focal plane thus giving the co-ordinates in said plane of the points A'B'C' and D'. Using these co-ordinates and the focal length Zf (see FIG. 4) of the lens 7 it is possible to calculate the relative orientation of the first target plane to the reference plane 41. The steps involved in this calculation are shown in FIG. 6.

Referring to FIG. 6 the first step is to set up the equations of the rays from the points A, B, C and D passing through the origin O of the co-ordinates lying in the reference plane 41 and the points A'B'C'D' in the focal plane 40. These equations are:

$$AB^2 = R_{oa}^2 + R_{ob}^2 - 2R_{oa}R_{ob}(l_a l_b + m_a m_b + n_a n_b) \quad (1)$$

$$BC^2 = R_{ob}^2 + R_{oc}^2 - 2R_{ob}R_{oc}(l_b l_c + m_b m_c + n_b n_c) \quad (2)$$

$$CA^2 = R_{oc}^2 + R_{oa}^2 - 2R_{oc}R_{oa}(l_c l_a + m_c m_a + n_c n_a) \quad (3)$$

$$BD^2 = R_{ob}^2 + R_{od}^2 - 2R_{ob}R_{od}(l_b l_d + m_b m_d + n_b n_d) \quad (4)$$

$$CD^2 = R_{oc}^2 + R_{od}^2 - 2R_{oc}R_{od}(l_c l_d + m_c m_d + n_c n_d) \quad (5)$$

$$AD^2 = R_{oa}^2 + R_{od}^2 - 2R_{oa}R_{od}(l_a l_d + m_a m_d + m_a n_d) \quad (6)$$

where AB is the length from A to B and similarly for BC, CA, DD, CD and AD.

And Roa is the length of the ray from the origin 0 to the point A in the appropriate target plane. Similarly for Rob, Roc and Rod.

And $l_a$, $m_a$ and $n_a$ are the direction cosines of the ray AOA' ie the cosine of the angle between the ray from A through O to A' and the X axis, Y axis and Z axis respectively. Similarly for $l_b$, $m_b$, $n_b$ ie ray BOB' $l_c m_c n_c$ ie ray COC' and $l_d\, m_d\, n_d$ ie ray DOD'.

The lengths AB, BC, CA, BD, CD and AD are known and the direction cosines may be calculated using the focal length $Z_f$ and the co-ordinates of the points A', B', C' and D' in the focal plane. Hence the equations may be solved for $R_{oa}$, $R_{ob}$, $R_{oc}$ and $R_{od}$. In FIG. 6 the method of solution is shown to be an iterative mathematical technique using the Newton-Rhapson formula. If the equations are solved in this manner the X, Y and Z co-ordinates of each point A, B, C and D may be calculated, however since the equations have two roots, for each triangle ABC, BCD, ACD and ABD whose vertices are given by the roots there is a complementary triangle whose vertices are given by the other root of the equation. Therefore each point A, B, C and D has six possible values along the X axis and similarly for the Y and Z axes. The triangles which give erroneous solutions to the co-ordinates of the points A, B, C and D may be eliminated by attempting to fit the triangles together into the known tetrahedron relationship. However the following method has been used successfully. Having established the XYZ co-ordinates of the points A, B, C and D the direction cosines of the P, Q and R axis may be calculated.

For example for the P axis it can be written:

$$l_p = (X_a - X_b)/P_a \quad (7)$$

$$m_p = (Y_a - Y_b)/P_a \quad (8)$$

$$n_p = (Z_a - Z_b)/P_a \quad (9)$$

where $l_p\, m_p\, n_p$ are the direction cosines of the P axis to the X, Y and Z axes respectively, and where $X_a\, Y_a$ and $Z_a$ are the X, Y and Z co-ordinates of the point of A and where $X_b$, $Y_b$ and $Z_b$ are the X, Y and Z co-ordinates of the point B ie the origin of the P, Q and R cartesian co-ordinate system and where $P_a$ is the P ordinate of the point A which lies on the P axis.

Similarly for points C and D which yield the direction cosines $l_q m_q n_q l_r m_r$ and $n_r$ of the Q and R axis to the X, Y and Z axes. The P Q and R co-ordinates of the cutting head are known and may, using these direction cosines, be transformed into XY and Z co-ordinates. For example, a point having the co-ordinates $P_l\, Q_l\, R_l$ the corresponding X, Y and Z co-ordinates ie x y and z may be written as:

$$x = P_l l_p + Q_l l_q + R_l l_r + X_b \quad (10)$$

$$y = P_l m_p + Q_l m_q + R_l m_r + Y_b \quad (11)$$

$$z = P_l n_p + Q_l n_q + R_l n_r + Z_b \quad (12)$$

This is done for a plurality of P Q and R co-ordinates of the cutting head sufficient to enable display 30 to be constructed. The display 30 may show a view of a projection of the object in the reference plane containing the XY, XZ or YZ axes.

It will be appreciated that the reference plane may be other than that illustrated in FIG. 4. If another reference plane is to be used it is necessary, once the X, Y and Z co-ordinates of the points A, B, C and D are known, to recalculate these co-ordinates in terms of the co-ordinates of a co-ordinate system which has its axes lying in the chosen reference plane and then to proceed as described above namely to calculate the direction cosines of the axes P Q and R to the reference plane axes and then to transform the P Q and R co-ordinates of the cutting head to the co-ordinates of the co-ordinate system which has its axes lying in the reference plane.

The four points in non-coplanar relationship may alternatively each be defined by an effectively point source radiation emitting means, e.g. an LED. The computer is then arranged to carry out a center-of-gravity fit on the elements of the two-dimensional array at the focal plane of the camera activated by said LED's. The process is set out in the flow charts of FIGS. 7 and 8.

The equations mentioned in the fourth step of FIG. 8 are:

Equations A through C $$A \ldots R_i^2 + R_j^2 - 2R_i R_j (l_i l_j + m_i m_j + n_i N_j) = L_{ij}^2$$

$$B \ldots R_j^2 + R_k^2 - 2R_j R_k (l_j l_k + m_j m_k + n_j n_k) = L_{jk}^2$$

$$C \ldots R_k^2 + R_i^2 - 2R_k R_i (l_k l_i + m_k m_i + n_k n_i) = L_{ki}^2$$

where $R_i$ is the length of the ray of light from point i on the target, to the origin $l_i$, $m_i$ and $n_i$ are the direction cosines of $ray_i$ $L_{ij}$ is the actual distance on the target from point i to point j.

The values of the indices i, j, k are shown in the table below:

|  | i | j | k |
| --- | --- | --- | --- |
| First triangle | 1 | 2 | 3 |
| Second triangle | 2 | 3 | 4 |
| Third triangle | 3 | 4 | 1 |
| Fourth triangle | 4 | 1 | 2 |

It is not essential to provide an initial background scan or "black frame" as described above, for the other mode of operation. Three LED's of the four only are activated at any one time; a corresponding photo sensitive element in the camera has thus to be illuminated for three frames (A, B, C, say) and dark for a fourth, D, to be counted as a validly illuminated or genuine point. In this way "rogue," or invalidly illuminated, points can be eliminated from the calculations with a high degree of certainty.

Instead of giving a display, as shown in FIG. 3, and described above, the computer 17 may be arranged to control the cathode ray tube 15 to display the required tunnel profile, and the position of the image 30 of the cutting head relative to the profile.

As exemplified above, the target 5 (FIG. 1) is mounted on a member 2, fixed spatially in relation to the cutting head 3, the position of which is to be detected. In some situations it may be inconvenient or even impossible to arrange the camera where it can observe a target 5 on the member 2. To overcome this difficulty, the target can be arranged on some more accessible part of the vehicle 1, or even on an extension of it to the left, as the vehicle appears diagrammatically in FIG. 1. Transducer means, which may in themselves be of conventional kind, are then provided, e.g. in the joint 4, whereby the positional relationship of the target to the cutting head can at all times be defined.

The apparatus may include control means, which in itself may be of conventional construction, responsive to the computer for controlling the position of the object, in this instance the cutting head 3, in order to maintain it within a predetermined range of positions as viewed in the reference plane, or other selected plane. Such control means may be located, for example, in the same housing as computer 17.

I claim

1. A tunneling machine having a cutting head adjustably supported by a member extending from said machine, and position detecting apparatus having
   (a) a target attached to said member in predetermined positional relationship to said cutting head, said target having identifying means for identifying therein at least four target points in non-coplanar relationship with each other;
   (b) a camera, having a focal plane at which images are formed, arranged to view the target so as to form on said focal plane images of at least three of said target points, said camera being adjustably positionable on a predetermined datum line and being disposed sufficiently close to said target to provide sensibly different angles to the points on said target which are being viewed by said camera; and
   (c) a computer arranged to receive signals indicative of the positions of said images on the focal plane of the camera, and for calculating from said received signals the orientation of the target points corresponding to said images in relation to a given reference plane, and for calculating thereby the position of the said cutting head as projected onto any other plane defined in relation to said given reference plane.

2. Apparatus according to claim 1 in which a first set of three out of said four target points comprises points which lie at the vertices of a first right angled triangle on said target, and in which a second set of three out of the said four target points comprises points which lie at the vertices of a second right angled triangle on said target, said two triangles being so arranged on said target that the bases of the triangles and the junction of the hypotenuses of the triangles with the bases are common.

3. Apparatus according to claim 2 in which the first and second triangles are normal to each other.

4. Apparatus according to claim 1 in which the identifying means for defining the four points on said target comprises radiation emitting means on said target.

5. Apparatus according to claim 4 in which the radiation emitting means on said target are arranged in straight lines which intersect at the said points.

6. Apparatus according to claim 4 in which the radiation emitting means are arranged effectively as point-sources, one at each of the said points.

7. Apparatus according to claim 4, in which the radiation emitting means comprises light emitting diodes.

8. Apparatus according to claim 4 in which the radiation emitting means exit in the infrared part of the spectrum.

9. Apparatus according to claim 4 having switch means arranged to control the computer and the radiation emitting means to effect comparison between the radiation received by the camera when the said radiation emitting means is emitting radiation, and the radiation received when the radiation emitting means is not emitting radiation.

10. Apparatus according to claim 4 having switch means arranged to control the computer and the radiation emitting means so that the camera receives, sequentially, radiation from points in the first and second sets of three points out of the four target points.

11. Apparatus according to claim 4 in which the camera has at its focal plane a two dimensional array of photo sensitive elements sensitive to the radiation emitted by the radiation emitting means.

12. Apparatus according to claim 11 in which the computer is arranged to perform a linear regression operation on the points on the focal plane of the camera corresponding to the elements of the two dimensional array illuminated by the radiation emitting means.

13. Apparatus according to claim 11 in which the computer is arranged to perform a centre-of-gravity fit on the points on the focal plane of the camera corresponding to the elements of the two dimensional array illuminated by the radiation emitting means.

14. Apparatus according to claim 1 in which the computer includes a store containing the co-ordinates of a portion of the cutting head relative to the position of the target attached to said member, the computer being responsive to said co-ordinates to calculate the position of the cutting head as projected onto the reference plane or other selected plane.

15. Apparatus according to claim 1 having control means responsive to the computer for controlling the position of the cutting head in order to maintain it within a predetermined range of positions as projected onto the reference plane or other selected plane.

16. Apparatus according to claim 1 having display means for displaying an image of the cutting head as projected on the reference plane or other selected plane.

* * * * *